United States Patent [19]

Ono et al.

[11] 3,881,195

[45] Apr. 29, 1975

[54] TRANSDUCER CLEANING UNIT

[75] Inventors: Kenji Ono; Koushin Ohba; Tatuo Hioka, all of Osaka, Japan

[73] Assignee: Matsushita Electric Industrial Co., Ltd., Osaka, Japan

[22] Filed: Oct. 16, 1973

[21] Appl. No.: 406,854

[30] Foreign Application Priority Data

| | | |
|---|---|---|
| Oct. 16, 1972 | Japan | 47-104291 |
| Oct. 16, 1972 | Japan | 47-120448 |
| Oct. 16, 1972 | Japan | 47-120449 |
| Nov. 17, 1972 | Japan | 47-133287 |

[52] U.S. Cl. .................................... 360/128; 274/47

[51] Int. Cl. ................................................ G11b 5/40

[58] Field of Search ....... 360/128, 129, 130; 274/47

[56] References Cited

UNITED STATES PATENTS

| | | | |
|---|---|---|---|
| 3,636,276 | 1/1972 | Rose | 360/128 |
| 3,717,855 | 2/1973 | Van Acker | 360/128 |
| 3,761,994 | 10/1973 | Becht | 360/128 |
| 3,763,352 | 10/1973 | Del Rio et al. | 360/128 |

*Primary Examiner*—Terrell W. Fears
*Assistant Examiner*—Jay P. Lucas
*Attorney, Agent, or Firm*—Wenderoth, Lind & Ponack

[57] ABSTRACT

A transducer cleaning unit is disclosed for use in a magnetic tape recording and/or reproducing apparatus utilizing a tape housed in a container, which is provided for cleaning a magnetic tape recording and/or reproducing head thereby avoiding a possible reduction of the output characteristic of the magnetic head. To this end, the cleaning unit comprises a solid block movable between elevated and descended positions and carrying a cleaning piece which sweeps the magnetic head during movement of the solid block from the elevated position to the descended position and/or from the descended position to the elevated position. This movement of the solid block is effected in response to the placing of the container within the tape receiving chamber of the tape recording and/or reproducing apparatus.

12 Claims, 10 Drawing Figures

TRANSDUCER CLEANING UNIT

The present invention relates to a magnetic tape recording and/or playback apparatus which utilizes a magnetizable tape accommodated in a container such as a cartridge, a cassette or the like and, more particularly, to a transducer cleaning unit for cleaning a magnetic tape recording and/or reproducing head employed in the recording and/or playback apparatus.

A carriage-type tape player now commercially available is adapted to receive and play exchangeable tape cartridges having a multi-track tape therein which is positioned to be engaged by the capstan shaft to drive the tape through the cartridge. The capstan is driven by an electrically operated motor having a drive shaft mounted with a pulley which is, in turn, connected through an endless belt to a flywheel coaxial with the capstan. A miniature switch responsive to the placing of any one of the cartridges in the tape receiving chamber of the tape player energizes the motor when the cartridge is placed in position within the tape receiving chamber. During operation of the tape player, the tape is in sliding contact with a magnetic tape recording and/or playback head which can be selectively aligned with different tracks of the tape by means of a transducer indexing mechanism.

In such a tape player, the magnetic tape recording and/or reproducing head is susceptible to unwanted materials, such as dust suspended in the air and/or magnetic particles dislodged from the tape during sliding engagement of the tape to the recording and/or reproducing head, which adhere to the recording and/or reproducing head, thereby adversely affecting the performance of the player itself.

In order to avoid such a reduction of performance of the tape player resulting from adhesion, by the effect of magnetic attraction and/or of moisture in the air, of the unwanted material to the recording and/or reproducing head, various cleaning methods have heretofore been proposed and practised. One of these known cleaning methods is to employ a cartridge containing a flexible cleaning strip, instead of the magnetic tape, which is inserted in the tape receiving chamber of the tape player not only to clean the magnetic head, but also to clear a sensor switch which energizes the transducer indexing mechanism to stepwisely shift the magnetic head relative to the multi-track tape. Insertion of the cartridge having the flexible cleaning strip therein must be effected prior to performance of the magnetic tape by the tape player.

However, the use of the cleaning cartridge is very troublesome and time-consuming and failure to insert the cleaning cartridge when cleaning of the magnetic head is desired often occurs.

Another conventional cleaning method is the use of a cleaning device comprising a manually pivotable lever carrying a cleaning head made of a piece of felt cloth impregnated with cleaning liquid, for example, silicon oil. With this conventional cleaning device, cleaning of the magnetic head is effected in such a manner that pivotal movement of the lever causes the cleaning head to travel in a substantially semi-circular path across and frontwardly of the magnetic head. Even this convenitonal cleaning has disadvantages in that, because of the cleaning head that must travel in the semi-circular path across and frontwardly of the magnetic head, uniform cleaning all over the head surface cannot be achieved and in that this cleaning device fails to provide protection of the magnetic head against the unwanted materials when the tape player is not in use. Furthermore, because of the manually operable lever, failure to operate the cleaning device when cleaning of the magnetic head is desired often occurs.

Accordingly, an essential object of the present invention is to provide an automatic cleaning unit for use in a magnetic tape recording and/or playback apparatus utilizing a magnetic tape accommodated in a container, which automatically functions to clean the magnetic head all over the surface thereof in response to the placing of the tape container within the tape receiving chamber.

Another object of the present invention is to provide an automatic cleaning unit of the type referred to above, which does not require an operator of the tape player to handle the cleaning unit.

A further object of the present invention is to provide an automatic cleaning unit of the type referred to above, which affords complete protection of the magnetic head from unwanted dust and/or magnetizable particles when the tape player is not in use.

A still further object of the present invention is to provide an automatic cleaning unit of the type referred to above, which can be manufactured with a minimum number of parts which do not increase the size of the tape player.

A still further object of the present invention is to provide an automatic cleaning unit of the type referred to above, which effectively prevents the performance of the magnetic head and, hence, the tape player itself, from being lowered, which may otherwise results from the presence of unwanted materials between the tape and the magnetic head during operation of the tape player.

In accomplishing these objects, according to the present invention, there is provided a magnetic head cleaning unit which comprises a solid block having an engagement surface and carrying a cleaning piece of a size sufficient to cover the whole surface of the magnetic head which faces the magnetic tape operatively housed in a container, i.e., a so-called cartridge or cassette. The solid block is movable between elevated and descended positions and collapsibly supported by a chassis in such a way that, when the solid block is in the elevated position, the cleaning piece contacts the magnetic head covering the surface thereof which faces towards the tape receiving chamber of the tape player and, when said solid block is in the descended position, the cleaning piece clears the magnetic head. Movement of the solid block in this way is effected in response to the placing of the container within the tape receiving chamber.

The cleaning piece employed in the present invention may be made of synthetic or natural spongy material, felt cloth, flexible plastic foam or the like, which is impregnated with cleaning liquid such as silicon oil, benzine or acetone. However, employment of a piece of felt cloth impregnated with silicon oil is preferred.

These and other objects and features of the present invention will become apparent from the following specific description taken in conjunction with preferred embodiments thereof with reference to the accompanying drawings, in which.

Figure 3:
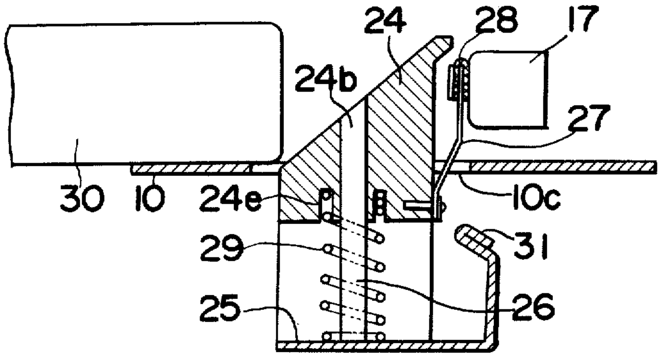
Figure 4:
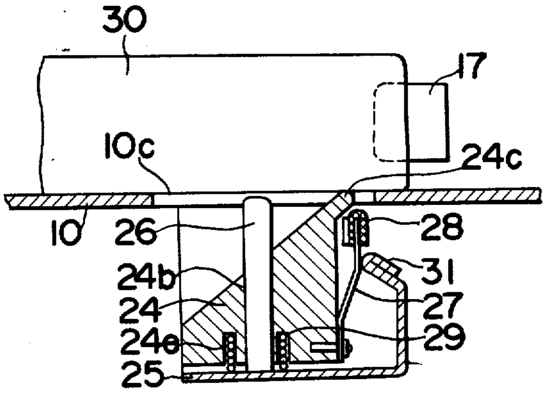
Figure 5:
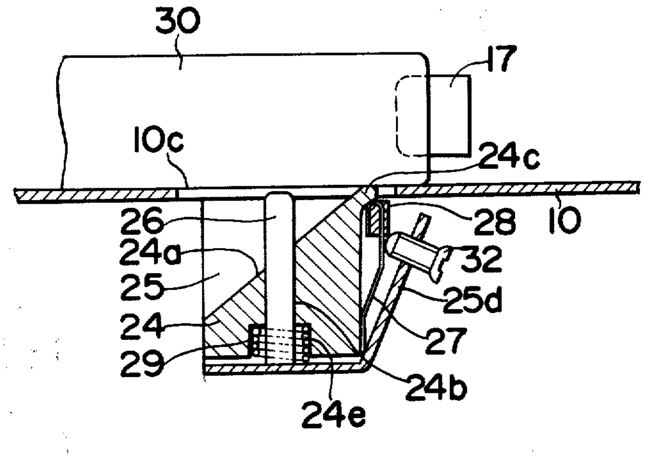
Figure 6:
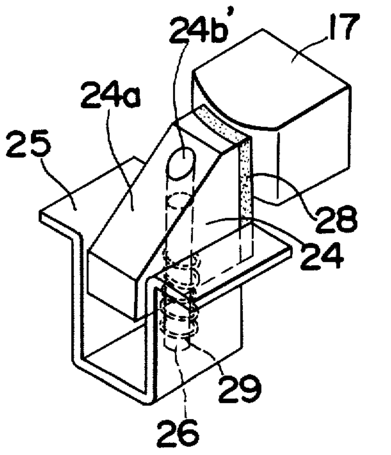
Figure 7:
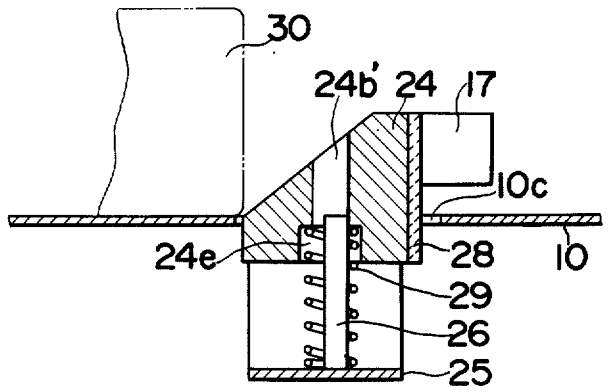
Figure 8:
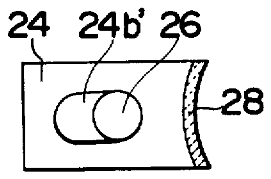
Figure 9:
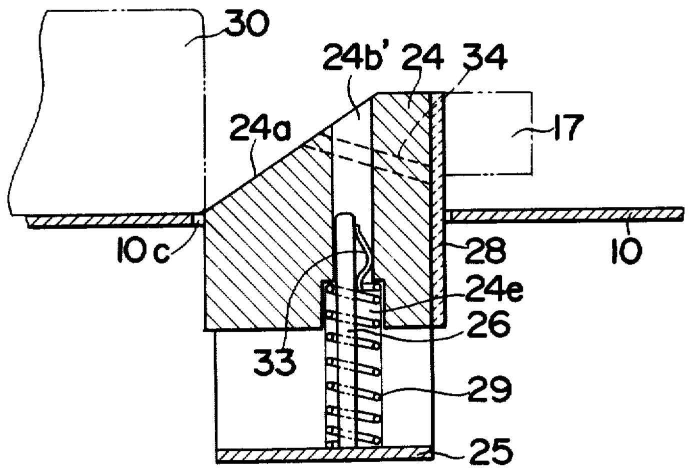
Figure 10:
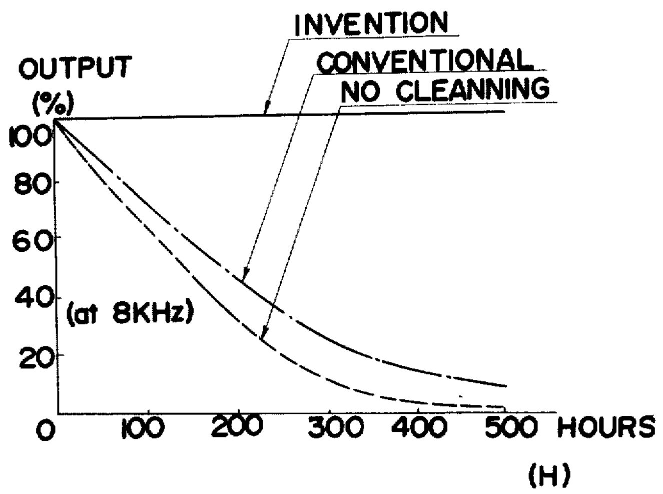

FIG. 3 is a side sectional view of the cleaning unit in an operatively elevated position, FIG. 4 is a side sectional view of the cleaning unit in an operatively descended position, FIG. 5 is a side sectional view of the cleaning unit in the descended position, showing another embodiment of the present invention, FIG. 6 is a perspective view of the cleaning unit according to a further embodiment of the present invention, FIG. 7 is a side sectional view of the cleaning unit shown in FIG. 6, FIG. 8 is a top plan view of a solid block used in the cleaning unit of FIG. 7, FIG. 9 is a side sectional view of the cleaning unit according to a still further embodiment of the present invention, and FIG. 10 is a graph showing the performance of the cleaning unit according to the present invention in comparison with the conventional cleaning methods, which is described in terms of the output characteristic of a magnetic recording and/or reproducing head within the high frequency range.

Before the description of the present invention proceeds, it should be noted that like parts are designated by like reference numerals throughout the several views of the accompanying drawings.

In the foregoing and following descriptions and the claims appended hereto, the terms "magnetic tape player" should be understood as an apparatus utilizing a length of magnetic tape or an endless magnetic tape, either of monotrack type or of multi-track type, said magnetic tape being accommodated in a container which is generally called cartridge or cassette, but not exclusive thereto, which includes a magnetic transducer or head having recording and/or reproducing capabilities. In any event, the present invention can be applicable in association with the magnetic transducer or head in any type of magnetic tape players so far as the magnetic tape is accommodated in a container sufficiently designed so as to operate the cleaning unit in response to the placing of the tape container within the tape receiving chamber of the tape player.

Figure 1:
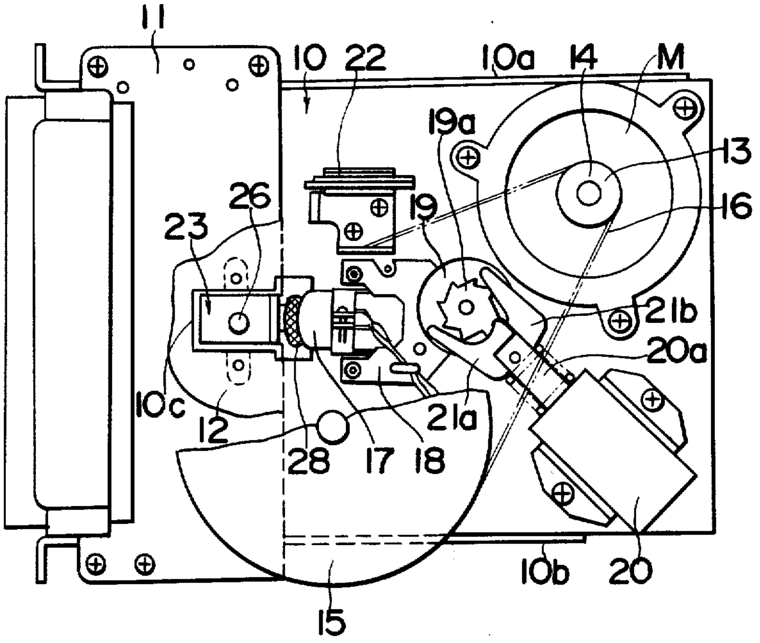
FIG. 1 is a top plan view of a multi-track tape recording and/or reproducing apparatus with a portion broken away to show a cleaning unit according to one embodiment of the present invention.

For the purpose of facilitating a better understanding of the present invention, the present invention will be described as applied in a commercially available 8-track, cartridge-type magnetic tape recorder, an essential construction of which is illustrated in FIG. 1.

The magnetic tape player illustrated in FIG. 1 comprises a chassis 10 having a pair of side walls 10*a* and 10*b* and a bridging plate 11 having both ends secured to the side plates 10*a* and 10*b* so as to bridge over the chassis 10. A space defined by the chassis 10, side walls 10*a* and 10*b* and the bridging plate 11 provides a tape receiving chamber 12.

This magnetic tape player is adapted to receive tape cartridges each having, for example, a multi-track magnetic tape, within the tape receiving chamber 12. The multi-track magnetic tape is, within the tape receiving chamber 12, positioned to be engaged by the capstan (not shown) to drive the same through the cartridge. An electric motor M drives a pulley 13 rigidly mounted on a drive shaft 14 of said motor M and connected with the capstan flywheel 15 coaxial with the capstan through an endless belt 16. The motor M can be operated by a miniature switch (not shown) responsive to the placing of the cartridge in the tape receiving chamber 12.

A magnetic tape reproducing and/or recording head 17 is mounted on a support plate 18 which is mounted on the chassis 10 for stepwise movement in a direction perpendicular to the plane of the chassis 10. This support plate 18 is operatively associated with a cam wheel 19 having a ratchet portion 19*a*, said cam wheel 19 being rotated in one predetermined direction by a solenoid unit 20 having a plunger 20*a* engaged to the geared portion 19*a* through a pair of actuating fingers 21*a* and 21*b*. Stepwise movement of the support plate 18 and, hence, the magnetic head 17 is effected each time the solenoid unit 20 is energized by an electrical signal fed from a sensor switch 22 which generates such electrical signal upon detection of a electrically conductive piece plated to the magnetic tape, thereby allowing the magnetic head 17 to align with different tracks of the magnetic tape.

The arrangement so far described is of a conventional construction and well understood by those skilled in the art and, therefore, the details thereof are herein omitted for the sake of brevity.

Figure 2:
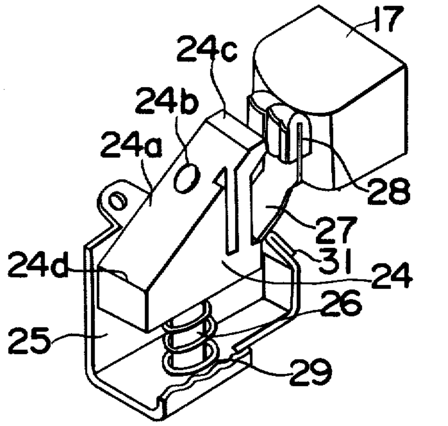
FIG. 2 is a perspective view of the cleaning unit shown in FIG. 1.

According to the present invention, the chassis 10 has an opening 10*c* formed therein for accommodating a head cleaning unit generally indicated by 23, the details of which are illustrated in FIGS. 2 to 4.

Referring now to FIGS. 2 to 4, the head cleaning unit comprises a solid block 24 of substantially triangular shape having an engagement surface as at 24*a*, which inclines at a certain angle relative to the plane of the chassis 10 when said cleaning unit 23 has been assembled in position. More specifically, the solid block 24 is supported by the chassis 10 through a flanged bracket 25 of substantially channel-shaped cross section, said flanged bracket 25 being rigidly secured to the undersurface of the chassis 10. The flanged bracket 25 has a guide post 26 rigidly mounted thereon and extends therefrom towards the opening 10*c* in the chassis 10, the tip of said guide post 26 terminating at the plane of the chassis 10.

The solid block 24 is formed with a guide hole 24*b* and has an elastic strip member 27, one end of which is rigidly secured to said solid block 24 and the other end mounted with a cleaning piece 28. This solid block 24 is movably mounted on the bracket 25 with the guide hole 24*b* receiving therein the guide post 26, in such a position as to fact the cleaning piece 28 to face towards the magnetic recording and/or reproducing head 17 and to face the engagement surface 24*a* towards a direction of insertion of a cartridge 30. A compression spring 29 is mounted on the guide post 26 and situated between the solid block 24 and the bracket 25 for upwardly biasing the solid block 24 towards an elevated position with the top, as at 24*c*, of said solid block 24 contacting the bridging plate 11. It should be noted that the root, as at 24*d*, of the engagement surface 24*a* of the solid block 24 should be situated, when said solid block 24 is in the elevated position, at or below the level of the chassis 10.

The cleaning piece 28, preferably made of a piece of felt cloth impregnated with silicon oil or any other cleaning liquid as hereinbefore described, has a size sufficient to cover substantially the entire surface of the head 17 which slidingly engages a magnetic tape contained in the cartridge 30 during operation of the tape player and it contacts said surface of the head 17 with a pressure exerted therebetween by the resiliency of the elastic strip member 27.

The bracket 25 is integrally formed with, or otherwise rigidly connected with, a presser member 31 which is slidingly engageable with the elastic strip member 27 so as to make the cleaning piece 28 clear of the magnetic head 17 during the later half of downward movement of the solid block 24 towards a descended position opposite to the elevated position. More particularly, the presser member 31 should be carefully positioned in such a way that disengagement of the cleaning piece 28 from the magnetic head 17 while the former sweeps the latter during the downward movement of the solid block 24 is effected when the tip of the cleaning piece 28 or the tip of the elastic strip member 27 approaches close to the lowermost edge of the head 17, or otherwise the opposite upward movement of the solid block 24 towards the elevated position will be hampered by the engagement of the cleaning piece 28 against the lowermost edge of the magnetic head 17.

For avoiding an arbitrary movement or displacement of the compression spring 29, a spring seat may be formed in the solid block 24 as at 24*e* for firmly receiving therein one end of the compression spring 29. In the example shown in FIGS. 2 to 4, the spring seat 24*e* is employed in the form of an annular groove and, in the other examples shown in FIG. 5, FIGS. 6 and 7 and FIG. 9, respectively, it is shown as employed in the form of an enlarged diameter portion of the guide hole 24*b* in the solid block 24.

In the above arrangement, insertion of the cartridge 30 into the cartridge receiving chamber 12 of the tape player causes the front lowermost edge thereof to slidingly engage the engagement surface 24*a* of the solid block, tending to ride over said engagement surface 24*a*. However, since the front uppermost edge of the cartridge 30 is restricted by the bridging plate 11, continuous movement of the cartridge 30 towards the magnetic head 17 causes the solid block 24 to be depressed, that is, downwardly move against the compression spring 29. As the solid block 24 downwardly moves from the elevated position, the cleaning piece 28 sweeps the magnetic head 17 from top to bottom thereby to clean the surface of the magnetic head 17 that slidingly engages with the magnetic tape. Further downward movement of the solid block 24 results in biasing the elastic strip member 27 against its own resiliency in contact with the presser member 31, thereby disengaging the cleaning piece 28 away from the magnetic head 17, substantially as shown in FIG. 4. At the time of completion of insertion of the cartridge 30 into the cartridge receiving chamber 12, the solid block 24 is held at the descended position with the top 24*c* thereof depressed by the cartridge 30 as shown in FIG. 4.

Removal of the once-inserted cartridge 30 from the cartridge receiving chamber 12 permits the solid block 24 to upwardly move to the elevated position by the action of the compression spring 29. Because of the provision of the presser member 31, the cleaning piece 28 will not be caught by the magnetic head 17 during the upward movement of the solid block 24. So long as no cartridge is inserted in the cartridge receiving chamber 12, the cleaning piece 28 serves to protect the magnetic head surface from being contaminated by foreign matters floating in the air.

In the foregoing embodiment, care must be taken in accurately positioning the presser member 31 as hereinbefore described. This requirement can be advantageously neglected if an adjustment screw 32 is employed as shown in FIG. 5. Referring to FIG. 5, the adjustment screw 32 is shown as supported by a projection 25*a* integrally extending from the bracket 25 and terminating close to the undersurface of the chassis 10 below the magnetic head 17.

Referring now to FIGS. 6 to 8, the arrangement which does not require the provision of the elastic strip member 27 and the presser member 31 or the adjustment screw 32 is shown. The cleaning unit in this embodiment is such that the cleaning piece 28 is lined on a surface of the solid block 24 which faces towards the magnetic head 17, and, accordingly, the cleaning piece 28 in this embodiment may have a size substantially equal to the surface area of said surface of said head 17. In addition, the guide hole 24*b*', which slidably receives therein the guide post 26, is employed, as best shown in FIG. 8, in the form of a slot which extends in parallel relation to the direction of insertion of the cartridge 30.

The compression spring 29 is, in this embodiment of FIGS. 6 to 8, mounted on the guide post 26 in such a diaplaced manner that the tip of the guide post 26 is relatively biased to one end of the slot 24*b*' close to the magnetic head 17. This compression spring 29 will be deformed immediately after engagement between the front lowermost edge of the cartridge 30 and the engagement surface of the solid block 24 has been established while the cartridge 30 is continuously moved forwardly into the cartridge receiving chamber 12. This deformation of the compression spring 29 takes place in such a manner that the tip of the guide post 26 relatively moves to the opposite end of the slot 24*b*' in which condition the cleaning piece 28 is relatively strongly pressed against the magnetic head 17.

Even in this arrangement, cleaning of the magnetic head 17 is performed in a similar manner as in the foregoing embodiments.

In the embodiment of FIG. 9, a leaf spring 33 is provided within the slot 24*b*' and has one end secured to the guide post 26 in any suitable method, for example, by the use of a fixture pin (not shown). This leaf spring 33 biases the solid block 24 close to the magnetic head 17 for improving the cleaning effect achieved by the cleaning piece 28.

In any of the embodiments shown in FIGS. 6 to 8 and FIG. 9, for supplying a cleaning liquid, for example, silicon oil, after the cleaning liquid impregnated in the cleaning piece 28 has been consumed, one or more supply passages as shown by 34 in FIG. 9 may be formed in the solid block 24, which extends clear of the slot 24*b*'.

Hereinafter, the effectiveness of the cleaning unit according to the present invention will be demonstrated with reference to FIG. 10.

A series of experiment were conducted by the use of the cleaning unit of the construction shown in FIGS. 2 to 4 wherein the cleaning piece 28 was impregnated with silicon oil, in such a manner that the cleaning unit was operated at intervals of 1 hour during 500 hours' run of the magnetic tape by repeatedly inserting the cartridge into the tape receiving chamber 12. Outputs of the magnetic head 17 at a frequency of 8 KHz were measured and plotted in a graph each time the cartridge was inserted into the cartridge receiving chamber 12 and, as a result thereof, the performance curve represented by the solid line in FIG. 10 was obtained.

For comparison purpose, the second mentioned conventional cleaning unit was tested in a manner similar to the procedure that the cleaning unit of the present invention had followed and the result was such as represented by the chain line in FIG. 10.

The broken line represents reduction of the output of the magnetic head during continuous 500 hours' run of the magnetic tape without cleaning the magnetic head.

From the graph of FIG. 10, it is evident that the cleaning unit of the present invention is effective in that a possible reduction of the output characteristic of the magnetic head in the magnetic tape player can be avoided.

Although the present invention has been fully described in conjunction with the various preferred embodiments thereof, it should be noted that numerous changes and modifications thereof are apparent to those skilled in the art without departing from the true scope of the present invention. Therefore, unless otherwise such changes and modifications depart therefrom, they should be construed as included within the true scope of the present invention.

What we claim is:

1. A transducer cleaning unit for use in association with a magnetic tape player utilizing a magnetic tape housed in a container, said tape player including a magnetic head situated within a container receiving chamber which is provided for accommodating the tape container during operation of the tape player, said transducer cleaning unit comprising, in combination:

a solid block supported by a chassis of the tape player for movement between first and second positions in a direction perpendicular to a direction of transfer of the magnetic tape;

means for biasing said solid block to the first position, said solid block being moved to the second position against said biasing means in response to the placing of the container within the container receiving chamber;

a cleaning piece carried by said solid block for sweeping the magnetic head during reciprocal movement of said solid block between said first and second positions;

an elastic member through which said cleaning piece is carried by said solid block, said elastic member having one end connected to said cleaning piece and the other end rigidly connected to said solid block, said cleaning piece being biased by the resiliency of said elastic member so as to contact said magnetic head; and means engageable with said elastic member for disengaging said cleaning piece from said magnetic head during the latter half of movement of said solid block from the first position to the second position and also from the second position to the first position, said cleaning piece sweeping said magnetic head during the first half of said movement of said solid block between said first and second positions.

2. A transducer cleaning unit as claimed in claim 1, wherein, when said solid block is in said first position urged by said biasing means, said cleaning piece is held in position to shield the contact surface of the magnetic head which contacts the magnetic tape during operation of the tape player.

3. A transducer cleaning unit as claimed in claim 1, wherein said disengaging means comprises an adjustment screw.

4. A transducer cleaning unit as claimed in claim 1, wherein said solid block has at least one passage formed therein and extending therein for supplying cleaning liquid onto said cleaning piece.

5. A transducer cleaning unit as claimed in claim 1, wherein said cleaning piece is lined to one surface of the solid block which faces the magnetic head.

6. A transducer cleaning unit for use in association with a magnetic tape player utilizing a magnetic tape housed in a container, said tape player including a magnetic head situated within a container receiving chamber which is provided for accommodating the tape container during operation of the tape player, said transducer cleaning unit comprising in combination:

a flanged bracket rigidly secured to a chassis of the tape player and having a guide post rigidly carried thereby and extending therefrom in a space defined by said flanged bracket and said chassis;

a solid block having a guide hole formed therein for slidably receiving therein said guide post and supported by said chassis of the tape player through said flanged bracket, said solid block being movable between elevated and descended positions in a direction perpendicular to a direction of transfer of the magnetic tape;

means for biasing said solid block to the elevated position, said solid block being moved to the descended position against said biasing means in response to the placing of the tape container within the container receiving chamber of the tape player;

a cleaning piece carried by said solid block for sweeping the magnetic head during reciprocal movement of said solid block between said elevated and descended positions;

an elastic member through which said cleaning piece is carried by said solid block, said elastic member having one end connected to said cleaning piece and the other end rigidly connected to said solid block, said cleaning piece being biased by the resiliency of said elastic member so as to contact said magnetic head; and means engageable with said elastic mmeber for disengaging said cleaning piece from said magnetic head during the latter half of movement of said solid block from the elevated position to the descended position and also from the descended position to the elevated position, said cleaning piece sweeping said magnetic head during the first half of said movement of said solid block between said elevated and descended positions.

7. A transducer cleaning unit as claimed in claim 6, wherein said solid block has at least one passage formed therein and extending therein for supplying cleaning liquid onto said cleaning piece.

8. A transducer cleaning unit as claimed in claim 6, wherein said guide hole is a slot substantially extending in a direction parallel to the direction of insertion of the tape container.

9. A transducer cleaning unit as claimed in claim 6, further comprising a leaf spring situated within said slot and having one end rigidly connected to the guide post for biasing said solid block towards the magnetic head.

10. A transducer cleaning unit as claimed in claim 6, wherein said solid block has an engagement surface inclined relative to the plane of the chassis of the tape player for sliding engagement with the front of the tape container as the latter is inserted into said container receiving chamber, thereby permitting the solid block to move from the elevated position to the descended position.

11. A transducer cleaning unit for use in association with a magnetic tape player utilizing a magnetic tape housed in a container, said tape player including a magnetic head situated within a container receiving chamber which is provided for accommodating the tape container during operation of the tape player, said transducer cleaning unit comprising in combination:

a flanged bracket rigidly secured to a chassis of the tape player and having a guide post rigidly carried thereby and extending therefrom in a space defined by said flanged bracket and said chassis;

a solid block having a guide hole formed therein for slidably receiving therein said guide post and supported by the chassis of the tape player through said flanged bracket and also having an engagement surface inclined relative to the plane of the chassis of the tape player for sliding engagement with the front of the tape container, said solid block being movable between elevated and descended positions in a direction perpendicular to a direction of transfer of the magnetic tape;

means for biasing said solid block to the elevated position, said solid block being moved to the descended position against said biasing means upon sliding engagement of the tape container to the engagement surface of the solid block during insertion of said tape container into said container receiving chamber of the tape player;

a cleaning piece lining one surface of the solid block which faces the magnetic head and slidably engaged to the magnetic head for sweeping the magnetic head during reciprocal movement of said solid block between said elevated and descended positions;

an elastic member through which said cleaning piece is carried by said solid block, said elastic member having one end connected to said cleaning piece and the other end rigidly connected to said solid block, said cleaning piece being biased by the resiliency of said elastic member so as to contact said magnetic head; and means engageable with said elastic member for disengaging said cleaning piece from said magnetic head during the latter half of movement of said solid block from the elevated position to the descended position and also from the descended position to the elevated position, said cleaning piece sweeping said magnetic head during the first half of said movement of said solid block between said elevated and descended positions.

12. A transducer cleaning unit for use in association with a magnetic tape player utilizing a magnetic : housed in a container, said tape player including a magnetic head situated within a container receiving chamber which is provided for accommodating the tape container during operation of the tape player, said transducer cleaning unit comprising, in combination:

a flanged bracket rigidly secured to a chassis of the tape player and having a guide post rigidly carried thereby and extending therefrom in a space defined by said flanged bracket and said chassis;

a solid block having a guide hole formed therein for slidably receiving therein said guide post and supported by the chassis of the tape player through said flanged bracket and also having an engagement surface inclined relative to the plane of the chassis of the tape player for sliding engagement with the front of the tape container, said solid block being movable between elevated and descended positions in a direction perpendicular to a direction of transfer of the magnetic tape;

means for biasing said solid block to the elevated position, said solid block being moved to the descended position against said biasing means upon sliding engagement of the tape container to the engagement surface of the solid block during insertion of said tape container into said container receiving chamber of the tape player;

a cleaning piece for sweeping the magnetic tape during reciprocal movement of said solid block between said elevated and descended positions;

an elastic plate member having one end rigidly secured to the solid block and the other end mounted with said cleaning piece, said cleaning piece being biased by the resiliency of said elastic member so as to contact said magnetic head; and means engageable with said elastic member for disengaging said cleaning piece from said magnetic head during the latter half of movement of said solid block from the first position to the second position and also from the second position to the first position, said cleaning piece sweeping said magnetic head during the first half of said movement of said solid block between said first and second positions.

* * * * *